(12) United States Patent
Ryu

(10) Patent No.: US 7,559,030 B2
(45) Date of Patent: Jul. 7, 2009

(54) METHOD OF PROVIDING NOTIFICATION SERVICE OF ELECTRONIC MAIL TRANSFER

(75) Inventor: Mi Seon Ryu, Seoul (KR)

(73) Assignee: Skyums Co. Ltd, Dongjak-Gu, Seoul (KR)

( * ) Notice: Subject to any disclaimer, the term of this patent is extended or adjusted under 35 U.S.C. 154(b) by 603 days.

(21) Appl. No.: 10/595,963

(22) PCT Filed: Dec. 9, 2004

(86) PCT No.: PCT/KR2004/003219
§ 371 (c)(1),
(2), (4) Date: May 22, 2006

(87) PCT Pub. No.: WO2005/057955
PCT Pub. Date: Jun. 23, 2005

(65) Prior Publication Data
US 2008/0320398 A1  Dec. 25, 2008

(30) Foreign Application Priority Data
Dec. 9, 2003 (KR) ............... 10-2003-0089187
Apr. 14, 2004 (KR) ............... 10-2004-0025621

(51) Int. Cl.
*G06F 3/00* (2006.01)

(52) U.S. Cl. .......... 715/752; 715/753; 715/733; 715/854; 715/716; 715/751; 455/466

(58) Field of Classification Search ......... 715/752, 715/753, 733, 854, 716, 751; 455/466
See application file for complete search history.

(56) References Cited

U.S. PATENT DOCUMENTS 6,910,187 B2 *  6/2005  Felkey et al. ............ 715/733
(Continued)

FOREIGN PATENT DOCUMENTS

KR   2002-0060385 A   7/2002

(Continued)

OTHER PUBLICATIONS

"Send SMS from Outlook". http://www.ipipi.com/help/sms_outlook.htm. 2007. 3 pages.*

(Continued)

*Primary Examiner*—Tadesse Hailu
*Assistant Examiner*—Michael Roswell
(74) *Attorney, Agent, or Firm*—Shalom Wertsberger; Saltamar Innovations

(57) ABSTRACT

Provided is a method for providing an electronic document transmission notification service for notifying transmission of the electronic mail That a sender creates and transmits to a receiver. The method is achieved by storing an email address of the receiver with a mobile phone number and a name on a database, simultaneously displaying an email writing window and a text message transmission window on a screen when the sender accesses a mail site and selects writing an e.mail (a first display step), when a receiver's email address is selected from the e.mail writing window, searching for a mobile phone number corresponding to a selected e.mail address and displaying the searched mobile phone number on a receiver's mobile phone number section (a second display step), when the sender writes a title and a content of an e.mail on the email writing window, displaying at least the title of the email in a content section of the text message transmission window (a third display step), and transmitting a message on the text message transmission window in form of a short message according to confirmation of the sender.

5 Claims, 4 Drawing Sheets

U.S. PATENT DOCUMENTS

| | | | |
|---|---|---|---|
| 6,948,131 B1 * | 9/2005 | Neven et al. | 715/753 |
| 7,218,943 B2 * | 5/2007 | Klassen et al. | 455/466 |
| 7,277,719 B2 * | 10/2007 | Klassen et al. | 455/466 |
| 7,363,345 B2 * | 4/2008 | Austin-Lane et al. | 709/207 |
| 2001/0005675 A1 * | 6/2001 | Aho | 455/412 |
| 2001/0005859 A1 * | 6/2001 | Okuyama et al. | 709/245 |
| 2002/0152220 A1 * | 10/2002 | Kang et al. | 707/101 |
| 2003/0172139 A1 * | 9/2003 | Srinivasan et al. | 709/221 |

FOREIGN PATENT DOCUMENTS

| | | |
|---|---|---|
| KR | 2002-00079674 A | 10/2002 |

OTHER PUBLICATIONS

"SMS Outlook—Mobile Messaging Using Familiar Email Clients" http://www.upsideweb.com/sms-outlook.htm. 2003. 2 pages.*

* cited by examiner

FIG. 3

| EMAIL ADDRESS (302) | MOBILE PHONE NUMBER (304) | NAME (306) |
|---|---|---|
| 123@patentsample.com | 010-123-4567 | ROBERT |
| test@psample.com | 010-321-0000 | JOHNSON |
| me@patentdrw.com | 010-456-7777 | DAVID |
| ⋮ | ⋮ | ⋮ |

US 7,559,030 B2

METHOD OF PROVIDING NOTIFICATION SERVICE OF ELECTRONIC MAIL TRANSFER

TECHNICAL FIELD

The present invention related to a method of providing an electronic document transmission notification service, and more particularly, to a method of providing an electronic document transmission notification service by which transmission of an electronic document is notified to a mobile terminal using a short message service (hereinafter, referred to as "SMS").

BACKGROUND ART

Recently, use of an electronic document such as an electronic mail or e-mail is gradually increased. Transmission of an electronic document is difficult to be recognized real time for a user who is not always connected to a network such as the Internet. To solve the problem, the SMS has been used as a method to notify receipt of the electronic document. However, since a huge number of spam mails are received, if the SMS is received for all mails, the user is heavily inconvenienced thereby.

Also, whenever a mail server tries to filter such spam mails, since the spam mails pass through a fire wall by frequently changing IDs, it is a big problem to use the SMS as a mail arrival notification on a receiver's burden.

To solve the problem, recently, mail portal service providers have suggested a method of sending the SMS on a sender's burden when there is an urgent need to notify transmission of an electronic document.

FIG. 1 illustrates an example of a conventional method of notifying transmission of an electronic document by sending an SMS. Referring to FIG. 1, according to the conventional notification method, after an email is transmitted, a message input window 110 and a mobile terminal input window 120 are displayed so that a sender needs to input again a content about the transmission of an email. Since such method is inconvenient for users, the number of users using the service has not noticeably increased. Further, according to the conventional method, there frequently occurs a case of sending an email to an incorrect email address due to an incorrect selection of an email address.

DISCLOSURE OF INVENTION

To solve the above and/or other problems, the present invention provides a method for providing an electronic document transmission notification service, by which a content of a transmitted email is quickly notified to an email receiver by clicking only one time without separately inputting a content on a text message transmission window, in storing a mobile phone number and a name are stored in a database with an email address of the receiver and transmitting a text message notifying that an email has been transmitted after writing and transmitting the email.

According to an aspect of the present invention, a method for providing an electronic document transmission notification service for notifying transmission of the is electronic mail that a sender creates and transmits to a receiver, comprises storing an email address of the receiver with a mobile phone number and a name on a database, simultaneously displaying an email writing window and a text message transmission window on a screen when the sender accesses a mail site and selects writing an email (a first display step), when a receiver's email address is selected from the email writing window, searching for a mobile phone number corresponding to a selected email address and displaying the searched mobile phone number on a receiver's mobile phone number section (a second display step), when the sender writes a title and a content of an email on the email writing window, displaying at least the title of the email in a content section of the text message transmission window (a third display step), and transmitting a message on the text message transmission window in form of a short message according to confirmation of the sender.

BRIEF DESCRIPTION OF THE DRAWINGS

FIG. 3 illustrates an example of an information content in form of an address book which is stored in a database of FIG. 2;

BEST MODE FOR CARRYING OUT THE INVENTION

Figure 1:
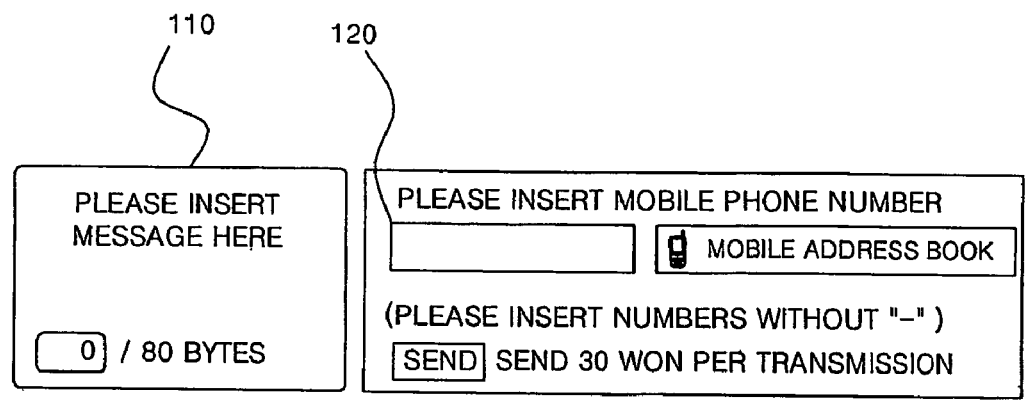
FIG. 1 illustrates an example of a conventional method of notifying transmission of an electronic document by sending an SMS.
Figure 2:
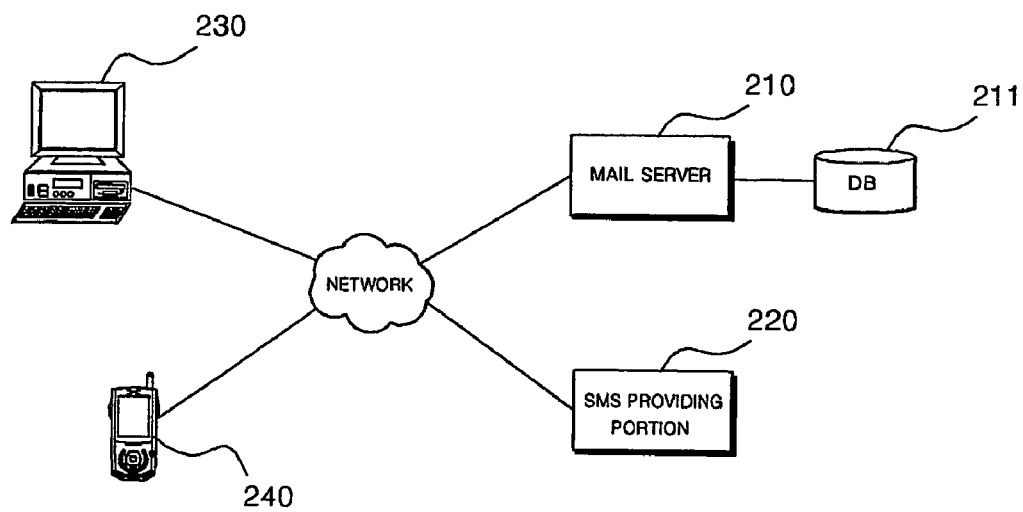
FIG. 2 illustrates a configuration of a system for providing an electronic document transmission notification service according to an embodiment of the present invention.

FIG. 2 illustrates a configuration of a system for providing an electronic document transmission notification service according to an embodiment of the present invention. FIG. 3 illustrates an example of an information content in form of an address book which is stored in a database of FIG. 2.

Referring to FIGS. 2 and 3, a system according to an embodiment of the present invention includes a mail server 210, a database (DB) 211, an SMS providing portion 220, a sender's terminal 230 for sending an electronic document, and a receiver's mobile terminal 240.

The mail server 210 runs a mail service site (hereinafter, referred to as "mail site") to provide a notification service according to the present invention and can be interconnected with the SMS providing portion through a network.

The mail server 210 provides a mailing service so that a sender accesses the mail site to send an email and supports through the below-described steps that the content of the email sent in a text message based on a short message. That is, the mail server 210 controls that, when a user selects a receiver's email address from an email writing window, a receiver's mobile phone number corresponding to the selected email address is searched and displayed on the text message transmission window at the same time and, when the user inputs the title and content of the email on the email writing window, the title and content, in particular, at least the title is simultaneously displayed.

The DB 211, as shown in FIG. 3, stores an email address 302, a mobile phone number 304, and a name 306 which are registered when the sender joined the mail site as a member, in form of an address book, and the contents of emails transmitted by the sender.

The SMS providing portion 220 transmits the short message created the mail server 210 to the receiver's mobile terminal 240. The short message can be provided by a mobile communication company of the receiver's mobile terminal 240.

The sender's terminal 230 can be interconnected with the mail server 210 and generally is a personal computer or a wireless terminal, for example, a notebook computer or a personal digital assistant (PDA), which can be interconnected with the mail server 210 through a network such as a wireless Internet.

The receiver's mobile terminal 240 is a terminal capable of receiving a short message from the SMS providing portion 220 and generally is a cellular phone, but not excluding a wireless terminal such as a PDA in a broad meaning of capable of receiving a short message.

A method for providing an electronic document transmission notification service according to the present invention using the system of FIG. 2 will be described below.

Figure 4:
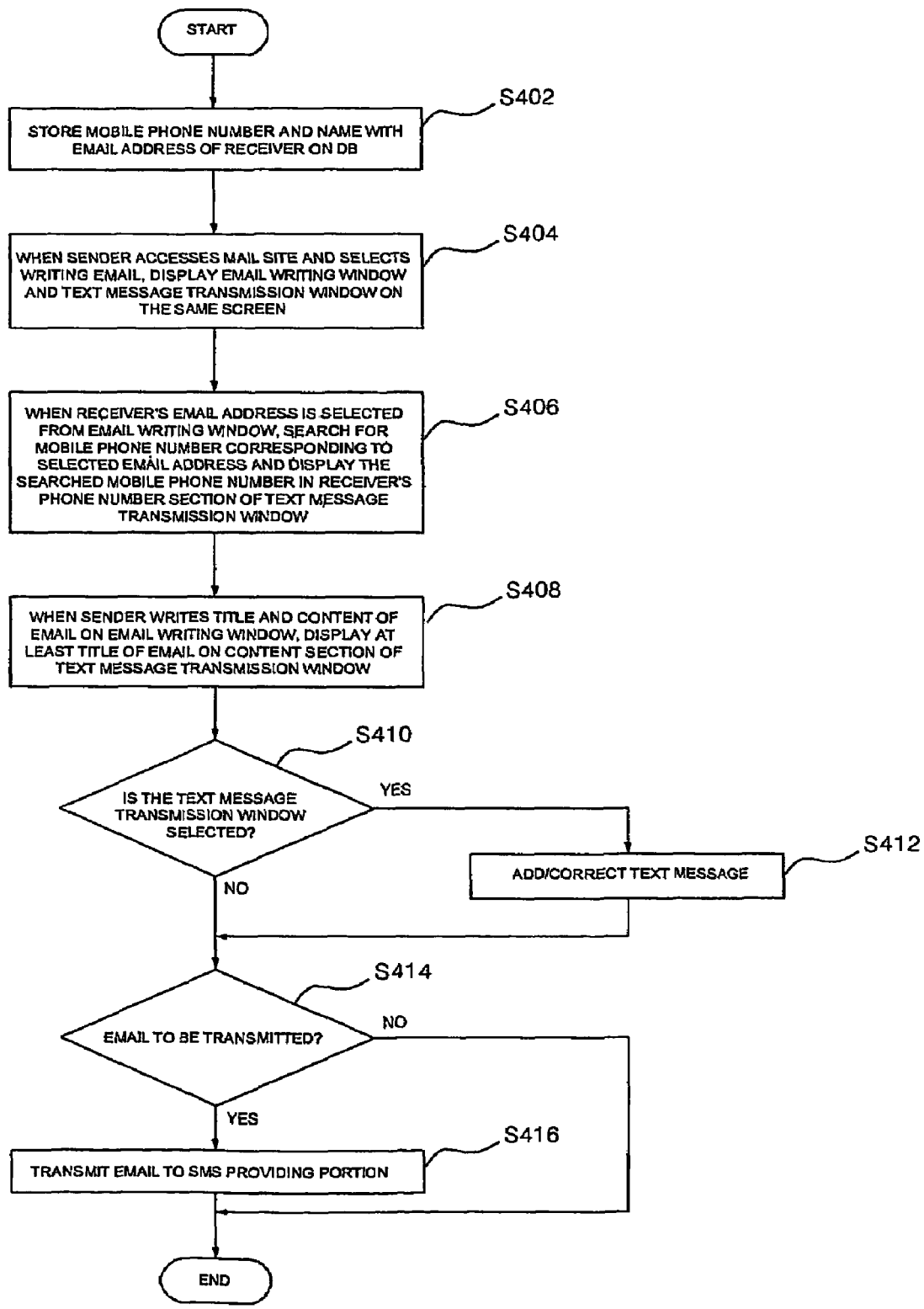
FIG. 4 is a flow chart for explaining a method of providing an electronic document transmission notification service according to an embodiment of the present invention.
Figure 5:
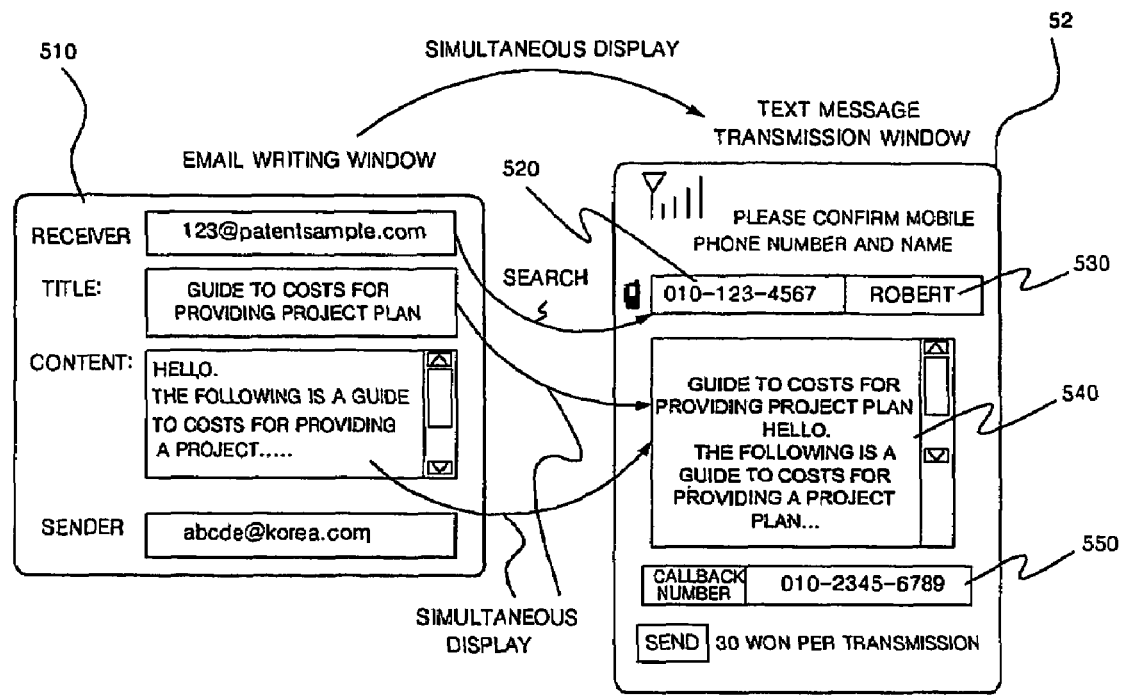
FIG. 5 is a reference view showing the method of FIG. 4 in detail.

FIG. 4 is a flow chart for explaining a method for providing an electronic document transmission notification service according to an embodiment of the present invention. FIG. 5 is a reference view showing the method of FIG. 4 in detail. The method for providing an electronic document transmission notification service according to an embodiment of the present invention explained in FIG. 4 shows a control process of notifying a content of transmission of an email created using the sender's terminal 230 to the receiver's mobile terminal 240.

In the method for providing an electronic document transmission notification service according to an embodiment of the present invention, a user, that is, a sender, accesses the mail site and stores an email address, a mobile phone number, and a name registered when the sender joined the mail site as a member, on the DB 211 (S402). The DB 211 contains information including the email address 302, the mobile phone number 304, and the name 306 of persons who the user frequently communicates with, in form of an address book.

The mail server 210 displays an email writing window 510 and a text message transmission window 52 on the same screen when the sender accesses the mail site and selects writing an email (S404).

Next, when the user selects an email address of a receiver from the email writing window 510, the mail server 210 searches the DB 211 for the mobile phone number 304 corresponding to the selected email address 302 and displays the searched mobile phone number 304 in a receiver's mobile phone number section 520 of the text message transmission window 52 (S406).

A receiver's name section 530 for displaying the name of a receiver corresponding to the searched mobile phone number is provided next to the receiver's mobile phone number section 520. since the name of a receiver is simultaneously displayed with the mobile phone number of the receiver, an error of transmitting an email to a wrong receiver can be prevented. Also, a mobile phone number of a sender which is registered at joining the mail site is displayed in a callback number section 550.

When the user writes a title and content of an email on the email writing window 510, the title and content are displayed on a content section 540 of the text message transmission window 52 (S408). The order of the steps S406 and S408 can be switched.

Then, when the user clicks the text message transmission window 52, it is assumed that an addition or correction to the displayed content exists, the text message can be added or corrected (S412).

When the sender desires to transmit a corresponding message (S414), the mail server 210 provides the message to the SMS providing portion 220 (S416) so that the message can be transmitted to the receiver.

According to the present invention, the receiver who receives an email can also notified of transmission of the email by a text message in form of a short message.

According to the present invention, the mail server 210 controls that information of the user and information of persons who the user frequently communicates with, which are provided by a subscriber of the mail site, are stored on the DB 211, the email writing window and the text message transmission window are simultaneously displayed on the same screen when a menu for transmitting an email is selected, the mobile phone number corresponding to the email address is automatically displayed in the mobile phone number section of the text message transmission window when the email address to send the email is selected, and the title and content are automatically displayed in the content section of the text message transmission window.

Since the content of the text message transmission window created as above is transmitted by only clicking a "SEND" icon, the user can conveniently send a notification that the email has been sent, with only the content of the email that is transmitted. Also, according to the present invention, the receiver's name section corresponding to the mobile phone number is provided next to the receiver's mobile phone number section in which the searched receiver's mobile phone number is displayed. Thus, since the name of the receiver is simultaneously displayed with the receiver's mobile phone number, an error of transmitting an email to a wrong receiver can be prevented.

In the above description, although the SMS notifying the transmission of an email is described, a case of notifying transmission of other electronic document is not excluded.

The above-described method can be embodied in a program and stored on a computer-readable recording medium such as a CD-ROM, a RAM, a ROM, a floppy diskette, a hard disk, or an optical magnetic disk.

While this invention has been particularly shown and described with reference to preferred embodiments thereof, it will be understood by those skilled in the art that various changes in form and details may be made therein without departing from the spirit and scope of the invention as defined by the appended claims.

INDUSTRIAL APPLICABILITY

As described above, according to the present invention, a summary of transmission of an electronic document such as an email is automatically created and transmitted to a receiver so that the transmission of an electronic document can be effectively notified to a receiver. Also, since the name of a receiver is simultaneously displayed with the mobile phone number of the receiver, an error of transmitting an email to a wrong receiver can be prevented.

What is claimed is:

1. A method for providing an electronic document transmission notification service for notifying transmission of the electronic mail that a sender creates and transmits to a receiver, the method comprising:

storing an email address of the receiver with a mobile phone number and a name on a database;

simultaneously displaying an email writing window and a text message transmission window on a screen when the sender accesses a mail site and selects writing an email (a first display step);

when a receiver's email address is selected from the email writing window, searching for a mobile phone number corresponding to a selected email address and displaying the searched mobile phone number on a receiver's mobile phone number section (a second display step);

when the sender writes a title and a content of an email on the email writing window, displaying at least the title of the email in a content section of the text message transmission window (a third display step); and transmitting a message on the text message transmission window in form of a short message according to confirmation of the sender.

2. The method of claim 1, further comprising allowing adding/correcting of the content of the email when the sender clicks the text message transmission window.

3. The method of claim 1, further comprising providing a receiver's name section corresponding to the receiver's mobile phone number next to a the receiver's mobile phone number section in which the receiver's mobile phone number searched in the second display step is displayed, so that the name of the receiver displayed in the receiver's mobile phone number section is searched and displayed.

4. The method of claim 1, wherein, in the transmitting of a message on the text message transmission window, a corresponding message is transmitted to an SMS providing portion of a mobile communication company to be transmitted to a mobile terminal of the receiver.

5. The method of claim 2, wherein, in the transmitting of a message on the text message transmission window, a corresponding message is transmitted to an SMS providing portion of a mobile communication company to be transmitted to a mobile terminal of the receiver.

* * * * *